(12) United States Patent
Takae et al.

(10) Patent No.: US 7,194,429 B2
(45) Date of Patent: Mar. 20, 2007

(54) METHOD FOR MANAGING PRODUCT INFORMATION AND METHOD FOR REQUESTING REPAIRS

(75) Inventors: Naohito Takae, Kawasaki (JP); Hiroyuki Tani, Obihiro (JP); Saiko Hanada, Aomori (JP)

(73) Assignee: Fujitsu Limited, Kawasaki (JP)

(*) Notice: Subject to any disclaimer, the term of this patent is extended or adjusted under 35 U.S.C. 154(b) by 517 days.

(21) Appl. No.: 09/805,046

(22) Filed: Mar. 14, 2001

(65) Prior Publication Data

US 2002/0040325 A1 Apr. 4, 2002

(30) Foreign Application Priority Data

Oct. 4, 2000 (JP) ............................. 2000-305298

(51) Int. Cl.
*G06Q 30/00* (2006.01)
(52) U.S. Cl. ..................... 705/26; 705/4; 705/27; 705/28; 235/383; 283/55
(58) Field of Classification Search ............... 705/4, 705/26, 27, 28; 235/383; 283/55
See application file for complete search history.

(56) References Cited

U.S. PATENT DOCUMENTS

| 3,661,407 | A | * | 5/1972 | Warren | .................. | 283/55 |
| 6,105,003 | A | | 8/2000 | Morohashi et al. | | |
| 6,199,755 | B1 | | 3/2001 | Matsumoto et al. | | |
| 6,336,100 | B1 | * | 1/2002 | Yamada | .................. | 705/26 |
| 6,604,681 | B1 | * | 8/2003 | Burke et al. | .................. | 235/383 |

| 2001/0051884 | A1 | * | 12/2001 | Wallis et al. | .................. | 705/4 |
| 2002/0111884 | A1 | * | 8/2002 | Groat et al. | .................. | 705/28 |

FOREIGN PATENT DOCUMENTS

| EP | 1028386 | | 8/2000 |
| JP | 08-050617 | | 2/1996 |
| JP | 10-340301 | | 12/1998 |
| JP | 2000-242666 | | 9/2000 |
| WO | WO 99/21610 | * | 5/1999 |

OTHER PUBLICATIONS

Lipton. Gigi M; "Product traceability: A guide for locating recalled manufactured goods"; Quality Congress. ASQ's . . . Annual Quality Congress Proceedings. Milwaukee, 1998, p. 423, 9 pgs; extracted from Proquest database on Internet on Aug. 3, 2004.*
Press release; "PinPoint Corporation Establishes Locateitl Partner Program to Provide Worlwide System Integrations and Support Services to 3D-iD Loal Positioning System Installations "; Business/Technology Editors; Business Wire; New York; Aug. 3, 1999; pg.*
European Office Action for Application No. 01 302 396.5-2221 issued Feb. 8, 2006.

* cited by examiner

*Primary Examiner*—Yogesh C. Garg
(74) *Attorney, Agent, or Firm*—Staas & Halsey LLP

(57) ABSTRACT

In a method for managing product information, warranty information corresponding to a purchased product identification received from a customer-terminal used by a customer is retrieved from a sales information management database, managing the purchased product identification identifying a product that the customer purchased and warranty information showing a warranty of the product, and then conducting a request process corresponding to a request item indicated from the customer-terminal.

10 Claims, 16 Drawing Sheets

```
PURCHASED PRODUCT LIST (090-1111-1111)

01 MAKER H    TV SET    RH-HF0002
   AAAAAA00000011    hhh@hhh.co.jp
02 MAKER F    RADIO-CASSETTE    AA-EDH01
   BBBBBB00000011    fff@fff.co.jp
```

FIG.8

REPAIR REQUEST SHEET 71

| | ISSUE DATE:10/09/2000 |

REPAIR REQUEST SHEET
(AAAAAA00000011)
SIR
REPAIR SHOP A
10-2, NOGI, AOMORI-SHI, AOMORI-KEN
017-XX-5555 } 711

PLEASE REPAIR THE FOLLOWING PRODUCT (S).

---

REPAIR REQUEST PRODUCT
MAKER    MANUFACTURE No.  PRODUCT NAME  WARRANTY PERIOD  REPAIRED BEFORE OR NOT } 713
MAKER H  RH-HF0002        TV SET        01/07/2001       NOT

---

CUSTOMER INFORMATION
FUJI, Michiko 10-10, NOGI, AOMORI-SHI, AOMORI-KEN  090-1111-1111 } 715

FIG.9

REPAIRED PRODUCT SHIPPING REQUEST SHEET 72

ISSUE DATE:10/09/2000

REPAIRED PRODUCT SHIPPING REQUEST SHEET
(AAAAAA00000011)

TO :
ADDRESS : 10-10, NOGI, AOMORI-SHI, AOMORI-KEN
NAME : FUJI,Michiko
PHONE : 090-1111-1111
} 721

PRODUCT  MAKER H  TV SET   RH-HF0002 } 723

FROM :
ADDRESS : 10-2, NOGI, AOMORI-SHI, AOMORI-KEN
NAME : SHOP A
PHONE : 017-XX-5555
} 725

FIG.10

COLLECTION REQUEST SHEET 73

COLLECTION REQUEST SHEET
(AAAAAA00000011)
SIR
COLLECTION SERVICE XXXX
10-2, NOGI, AOMORI-SHI, AOMORI-KEN
017-XX-5555
} 731
    PLEASE COLLECT AND DISPOSE OF THE FOLLOWING PRODUCT

COLLECTION PRODUCT
MAKER NAME   MANUFACTURE No.   PRODUCT NAME   COLLECTION FEE   } 733
MAKER H      RH-HF0002         TV SET         ¥3000

CUSTOMER INFORMATION
FUJI, Michiko 10-10, NOGI, AOMORI-SHI, AOMORI-KEN  090-1111-1111 } 735

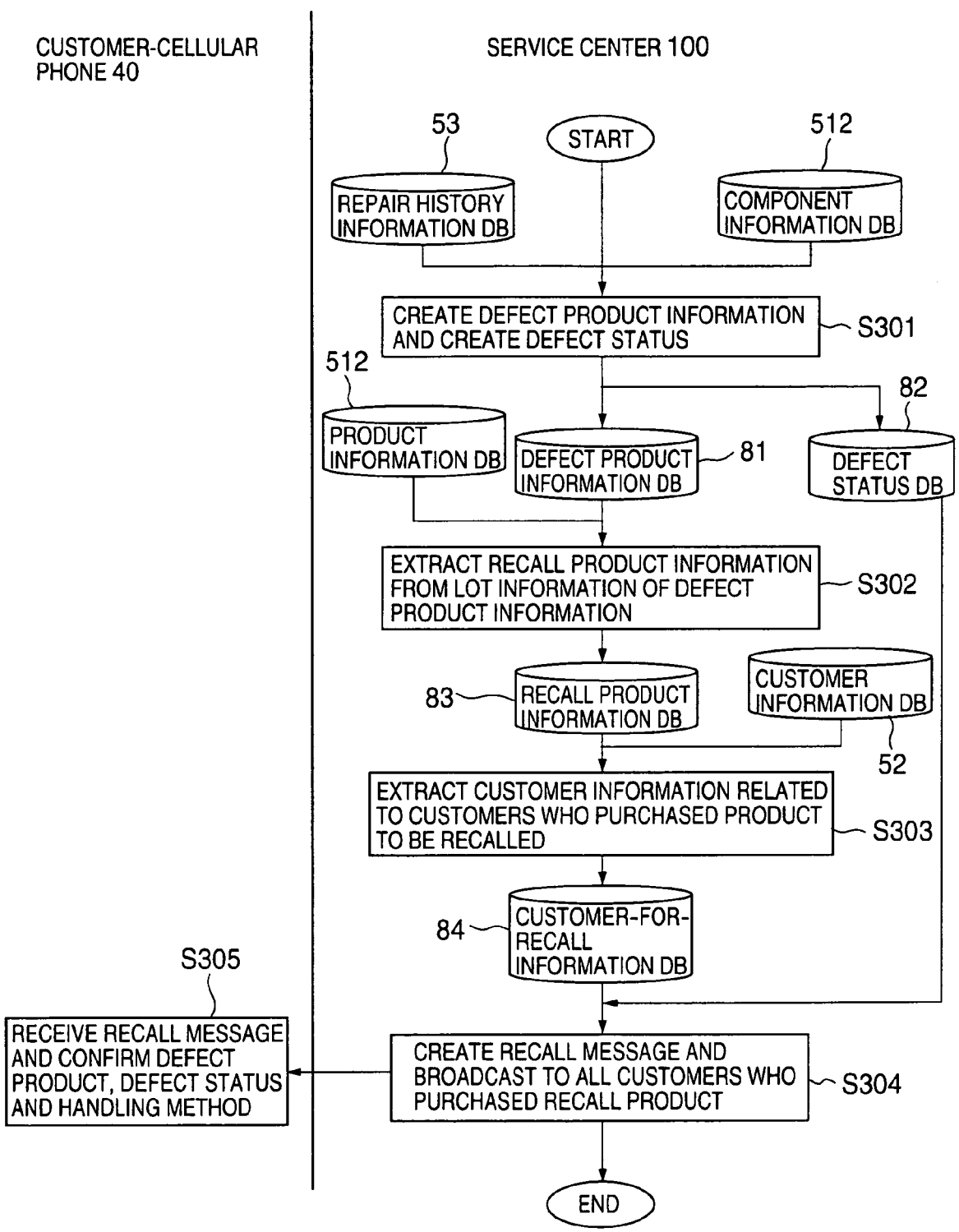

FIG.14A

PRODUCT INFORMATION DB 51

| No. | MANUFACTURE NUMBER | PRODUCT NAME | WARRANTY PERIOD | REPLACEMENT TIME | COLLECTION FEE | LOT INFORMATION | MANUFACTURED DATE | MAKER NAME | MAKER E-MAIL |
|---|---|---|---|---|---|---|---|---|---|
| 1 | RH-HF 0002 | TV SET | 1 YEAR | 6 YEARS | 3000 | AA00001 | 19990510 | MAKER H | hhh@hhh.cojp |
| 2 | AA-EDH01 | RADIO-CASSETTE | 1 YEAR | 8 YEARS | 1000 | BB00002 | 19991015 | MAKER F | fff@fff.cojp |
| 3 | DD-AC010 | REFRIGERATOR | 2 YEARS | 7 YEARS | 5000 | CC00001 | 19990708 | MAKER G | ggg@ggg.cojp |

FIG.14B

COMPONENT INFORMATION DB 512

| No. | COMPONENT NUMBER | COMPONENT NAME | LOT | MANUFACTURED DATE |
|---|---|---|---|---|
| 1 | AAA01-01 | BASIC BOARD | DD00001 | 20000323 |
| 2 | BBB01-01 | MAIN BOARD | GG00001 | 20000323 |
| 3 | CCC01-01 | TUNER | AA00001 | 19990510 |
| 4 | CCC01-01 | TUNER | AA00010 | 19990610 |
| 5 | CCC01-01 | TUNER | AA00020 | 19990710 |

FIG. 15A

CUSTOMER INFORMATION DB 52

| No. | PURCHASE NUMBER | MANUFACTURE NUMBER — PRODUCT NUMBER | MANUFACTURE NUMBER — MANUFACTURE NUMBER | DEVICE ADDRESS | PURCHAED DATE | WARRANTY PERIOD | CELLULAR PHONE NUMBER | PHONE E-MAIL | NAME | ADDRESS |
|---|---|---|---|---|---|---|---|---|---|---|
| 1 | AAAAAA00000011 | TV SET | RH-HF0002 | 1234567 | 20000701 | 20010701 | 090-1111-1111 | a@xxx.cojp | Fuji, Michiko | 10-10, NOGI, AOMORI-SHI, AOMORI-KEN |
| 2 | AAAAAA00000011 | RADIO-CASSETTE | AA-EDH01 | 1234568 | 20000801 | 20010801 | 090-1111-1110 | a@xxx.cojp | Fuji, Michiko | 10-10, NOGI, AOMORI-SHI, AOMORI-KEN |
| 1 | AAAAAA00000011 | REFRIGE-RATOR | DD-AC010 | 2345678 | 20000701 | 20010701 | 090-1111-1112 | bbb@ccc.cojp | Fuji, Fujio | ODATE-SHI, AKITA-KEN |

WARRANTY INFORMATION

FIG. 15B

SHOP INFORMATION DB 54

| No. | SHOP ICOOD | SHOP NAME | SHOP PHONE NUMBER | E-MAIL | ADDRESS |
|---|---|---|---|---|---|
| 1 | AAAAAA | SHOP A | *-**-1111 | a@xxx.cojp | NOGI, AOMORI-SHI, AOMORI-KEN |
| 2 | BBBBBB | SHOP B | *-**-1234 | b@xxx.cojp | OHI, SHINAGAWA-KU, TOKYO |

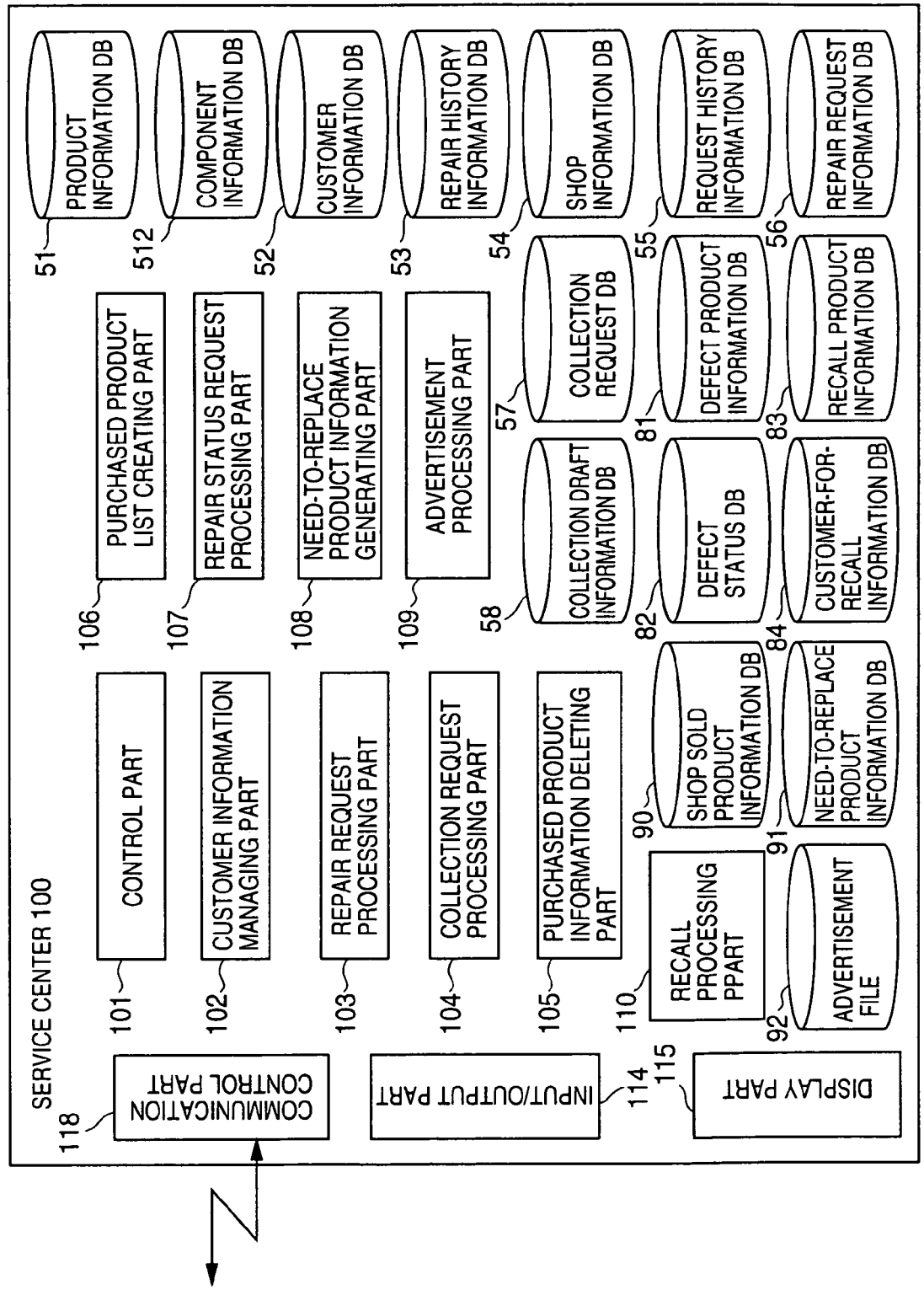

METHOD FOR MANAGING PRODUCT INFORMATION AND METHOD FOR REQUESTING REPAIRS

BACKGROUND OF THE INVENTION

1. Field of the Invention

The present invention generally relates to methods for managing production information and methods for requesting a repair, and more particularly to a method for managing production information, in which purchased product information concerning the product, shop information concerning a shop and customer information concerning a customer who purchased the product from the shop are managed so that the customer is not required to maintain a warranty paper sheet of a product that the customer purchased and which method can provide the product information of a product that the shop sold and can also provide purchased product information of a product that the customer purchased, and a method for requesting a repair, in which a customer, who purchased a product, can request to repair the product by using a cellular phone of the customer.

2. Description of the Related Art

Generally, after a customer purchases a home electronic product, the customer is required to individually maintain a warranty paper sheet carried with the product. When the customer requests a repair of the product the customer purchased, the customer has to find the warranty paper sheet and then make a phone call to a telephone number of a service center described on the warranty paper sheet in order to request to repair the product. Otherwise, the customer directly brings the product to the shop that can repair the product and then requests the shop to repair the product.

However, there are disadvantages in the conventional way of that the customer maintains warranty paper sheet by ones self.

When a product that the customer purchased has a problem, the customer has to find the warranty paper sheet and confirm a period of warranty. Thus, it takes time before the customer asks the shop to repair the product.

In addition, a maker producing the product usually does not maintain customer information. Thus, when a recall of a defective product occurs, the maker can not directly notify the customer of the recall of the product that the customer purchased.

SUMMARY OF THE INVENTION

It is a general object of the present invention to provide methods for managing product information and methods for requesting a repair, in which the above-mentioned problems are eliminated.

A more specific object of the present invention is to provide a method for managing product information in which purchased product information concerning a product that a customer purchased and information concerning the customer and a shop where the customer purchased the product can be centralized in a service center supported by product makers, so that the customer is not required to maintain warranty information of the purchased product, product information of purchased product can be provided to the customer, and recall information can be directly provided to the customer who purchased a product to be recalled.

Another specific object of the present invention is to provide a method for requesting a repair in which a customer can easily request to repair a purchased product by using a customer-terminal.

The above objects of the present invention are achieved by a method for managing product information, the method including the steps of: (a) retrieving warranty information corresponding to the purchased product identification received from a customer-terminal used by a customer, from a sales information management database managing the purchased product identification identifying a product that the customer purchased and the warranty information showing a warranty of the product; (b) informing the customer of selectable request items with the warranty information retrieved in the step (a) by transmission to the customer-terminal; and (c) conducting a request process corresponding to one of the selectable request items, which is indicated from the customer-terminal.

According to the present invention, in the method, the warranty information is sent to the customer-terminal based on the purchased product identification received from the customer-terminal. Therefore, the customer does not have to maintain a warranty paper sheet of the purchased product by himself. In addition, the selectable request items are transmitted with the warranty information to the customer-terminal. Therefore, the customer can request a desired process by simply selecting one of the selectable request items from the customer-terminal.

The customer-terminal can be a cellular phone of the customer.

The warranty information can be information including a warranty period while the product is guaranteed.

In addition, the above objects of the present invention are achieved by the method wherein the sales information management database manages the customer information concerning the customer by corresponding to the purchased product identification of the product that the customer purchased, and the step (c) including the steps of: (d) distributing a repair request sheet including repair information for a repair person who is selected by searching the sales information management database based on the customer information corresponding to the purchased product identification received from the customer-terminal when one of the selectable request items, which is indicated from the customer-terminal, shows a request to repair the product that the customer purchased; and (e) maintaining repair contents conducted by the repair person and the purchased product identification of a repaired product as repair history information to a repair history database. The method can further include the steps of: (f) searching for the purchased product identification corresponding to the repair contents showing a recall from the repair history database; (g) extracting the customer information from the sales information management database based on the purchased product identification searched in the step (f); and (h) informing recall information to recall a product, to each customer who purchased the product based on the customer information extracted in the step (g).

According to the present invention, in the method, the customer information of the customer who purchased a product to be recalled can be extracted from the repair history information database including repair contents related to the recall and the sales information management database. Also, based on the customer information, the customer can directly obtain information concerning the recall.

Therefore, it is possible to directly provide the information concerning the recall to the customer who needs to know about the recall.

Alternatively, the above objects of the present invention are achieved by a computer-readable recording medium having a program recorded thereon for causing a computer to manage product information.

Also, the above objects of the present invention are achieved by an apparatus for managing product information in accordance with the above method for managing product information.

The other objects of the present invention are achieved by a method for requesting to repair a purchased product through a customer-terminal, the method including the steps of: displaying a product list listing purchased products at a display unit of the customer-terminal; sending purchased product identification identifying a product selected from the product list by a customer using the customer-terminal, to a support center supporting the product; and requesting to repair the product identified by the purchased product identification by informing the support center one of selectable request items, which is selected by the customer, when warranty information showing warranty contents of the product and the request items received from the support center.

According to the present invention, in the method, the customer who purchased the product can send the purchased product identification by selecting the product from the product list displayed at the customer-terminal. In addition, the customer can refer to the received warranty information and also can request to repair the purchased product by simply selecting a desired request item from the selectable request items transmitted from the support center. Therefore, the customer is not required to maintain the warranty paper sheet of the purchased product and the customer can easily request to repair the purchased product.

BRIEF DESCRIPTION OF THE DRAWINGS

Other objects, features and advantages of the present invention will become more apparent from the following detailed description when read in conjunction with the accompanying drawings, in which:

FIG. 4 is a diagram showing a display example of a purchased product list according to the embodiment of the present invention;

FIG. 8 is a diagram showing a repair request sheet according to the embodiment of the present invention;

FIG. 9 is a diagram showing a repaired product shipping request sheet according to the embodiment of the present invention;

FIG. 10 is a diagram showing a collection request sheet according to the embodiment of the present invention;

FIG. 13 is a flowchart for explaining a recall process according to the embodiment of the present invention;

FIG. 14A is a diagram showing a product information DB according to the embodiment of the present invention and FIG. 14B is a diagram showing a component information DB according to the embodiment of the present invention;

FIG. 15A is a diagram showing a customer information DB according to the embodiment of the present information and FIG. 15B is a diagram showing a shop information DB according to the embodiment of the present invention; and FIG. 16 is a diagram showing a functional structure of the service center according to the embodiment of the present invention.

DESCRIPTION OF THE PREFERRED EMBODIMENTS

An embodiment according to the present invention will now be described with reference to figures.

Figure 1:
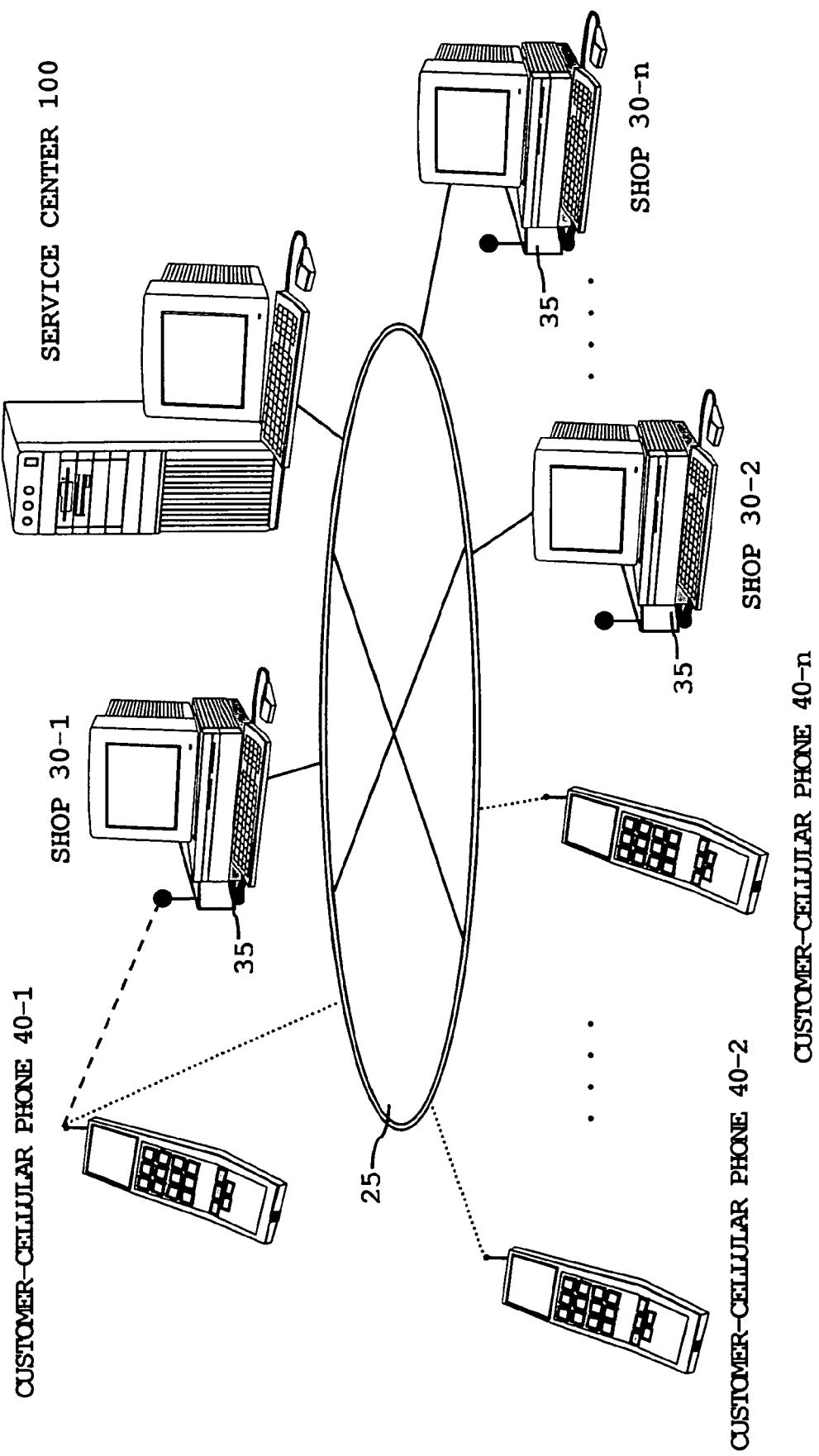
FIG. 1 is a diagram showing a system configuration according to an embodiment of the present invention.

A product information management system according to the embodiment of the present invention is configured such as a system shown in FIG. 1. FIG. 1 is a diagram showing the system configuration according to the embodiment of the present invention.

In FIG. 1, through the network 25, a service center 100 for managing information concerning sold products, shops 30-1 though 30-n for selling products to customers and customer-cellular phones 40-1 through 40-n are connected.

When a customer purchases a product at the shop 30-1, the shop 30-1 sends the customer-cellular phone 40-1 a purchase number specifying the product that the customer purchased and also sends an e-mail address of the service center 100. For example, the shops 30-1 and 30-2 send the customer-cellular phone 40-1 the purchase number and the e-mail address of the service center 100 by communication means 35.

Information concerning the customer is sent to the service center 100 with information concerning the product that the customer purchased, through the shop 30-1.

The service center 100 maintains the information received from the shop 30-1 as customer information. After that, the service center 100 can send the customer-cellular phone information concerning a repair of the purchased product or a recall of the purchased product.

Figure 2:
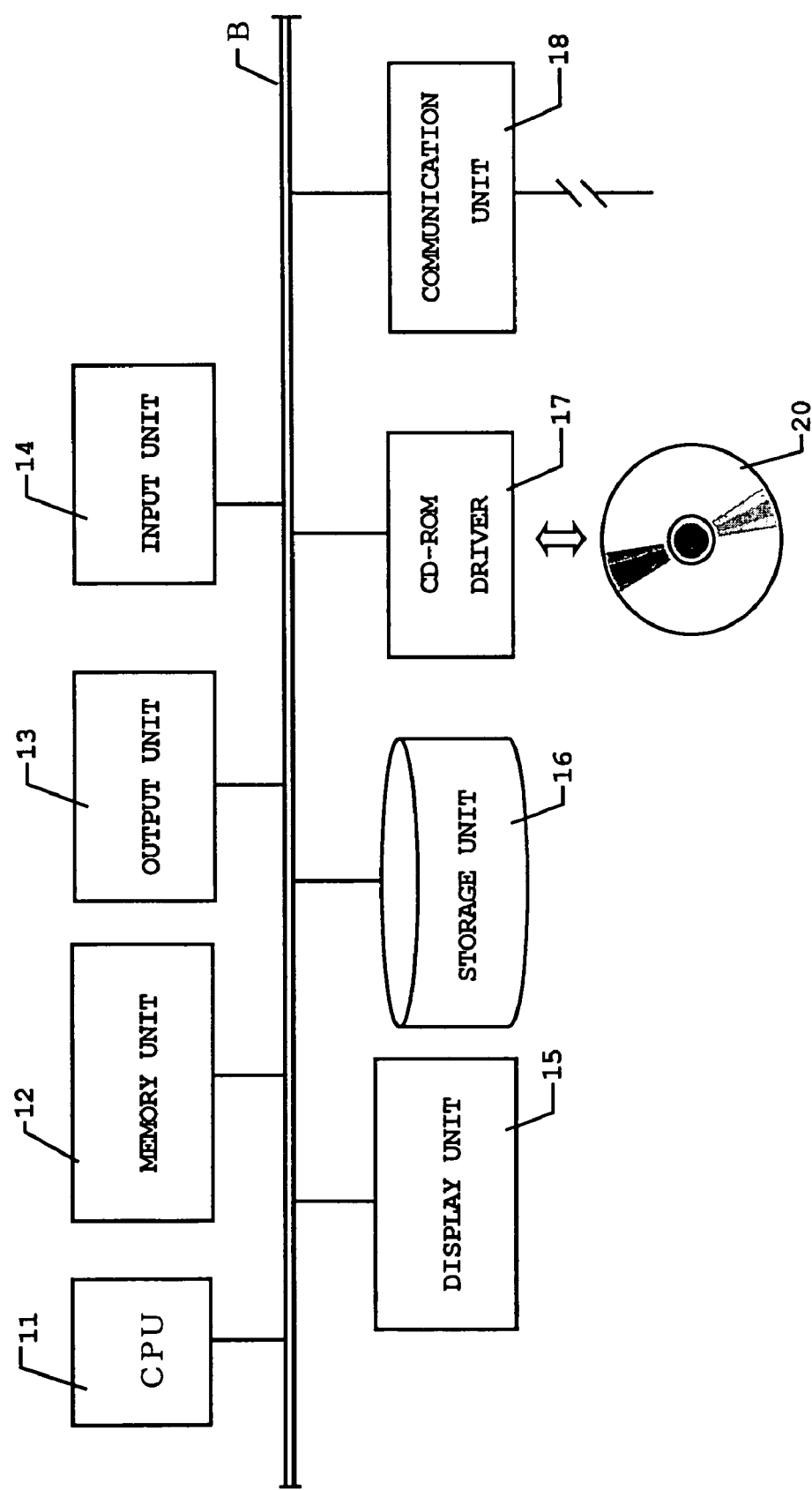
FIG. 2 is a diagram showing a hardware configuration according to the embodiment of the present invention.

For example, a hardware configuration of a computer system provided in the service center 100 according to the embodiment of the present invention can be as shown in FIG. 2. FIG. 2 is a diagram showing the hardware configuration according to the embodiment of the present invention.

In FIG. 2, the computer system of the service center 100 includes a CPU (Central Processing Unit) 11, a memory unit 12, an output unit 13, an input unit 14, a display unit 15, a storage unit 16, a CD-ROM driver 17 and a communication unit 18, all of which are connected together through a bus B.

The CPU 11 controls the product information management system in accordance with programs stored in the memory unit 12 and also executes processes (described later) in the service center 100. The memory unit 12 includes a RAM and a ROM and stores the programs executed by the CPU 11, data necessary for processes and data obtained by the processes. Also, a part of an area of the memory unit 12 is used as a working area for the processes executed by the CPU 11.

The output unit 13 includes a printer or the like and is used to output a process result or indicated information. The input unit 14 includes a mouse, a keyboard or the like and is used to input information. The display unit 15 displays information for users.

The storage unit 16 includes a hard disk and stores files, databases and a product information program.

The communication unit 18 controls data transmissions for sending or receiving information between the service center system 100 and each of shops 30-1 through 30-*n* or each of customer-cellular phones 40-1 through 40-*n*.

For example, a program of the process conducted in the service center 100 is installed into the service center 100 by loading a CD-ROM 20 into the CD-ROM driver 17. That is, when the CD-ROM 20 storing the program for managing product information is inserted in the CD-ROM driver 17, the CD-ROM driver 17 reads the program from the CD-ROM 20 and the program read from the CD-ROM 20 is installed into the storage unit 16 via the bus B. When the process for regenerating a trading board is executed, the CPU 11 executes the process in accordance with the program installed into the storage unit 16. It should be noted that a recording medium is not limited to the CD-ROM 20, but another computer-readable recording medium such as a magnetic disk, a magnetic tape, an optical disk, a magneto-optical disk, a semiconductor memory or the like may be used.

The product information management system of the service center 100 will now be described.

A process when a customer purchases a product will now be described with reference to FIG. 3.

Figure 3:
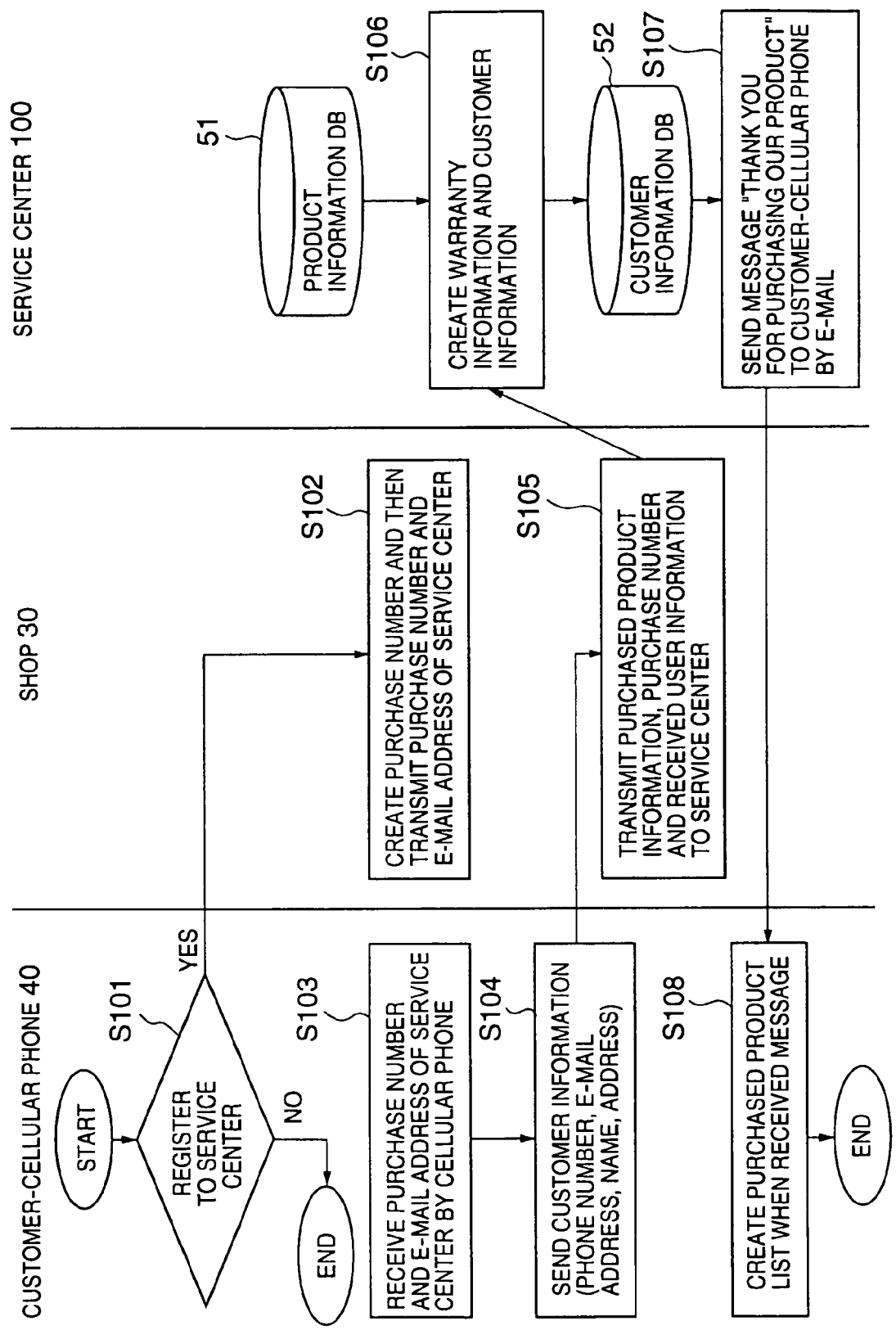
FIG. 3 is a flowchart for explaining a process for managing customer information of a product that a customer purchased, according to the embodiment of the present invention.

FIG. 3 is a flowchart for explaining a process for managing customer information of a product that a customer purchased, according to the embodiment of the present invention.

In FIG. 3, when the customer purchases a home electronic product, the customer decides at a shop 30 (hereinafter, the shop 30 represents any one of the shops 30-1 through 30-*n*) whether or not to register as a user of the product to the service center 100 (step S101), when the customer pays at a cashier.

In step S102, when the shop 30 creates a new purchase number based on the decision of the customer at the cashier. For example, the new purchase number created by the shop 30 includes a shop number identifying the shop 30 and a management number. In a case in which a transceiver function is provided in a customer-cellular phone 40 (hereinafter, the customer-cellular phone 40 represents any one of the customer-cellular phone 40-1 through 40-*n*), the new purchase number and an e-mail address of the service center 100 are transmitted to the customer-cellular phone 40 by the communication means 35 provided to the shop 30. The email address of the service center 100 can be a service center managed by a maker of the product that the customer purchased, or a maintenance center for the shop 30 as a service center. The shop 30 may select any one of the service centers as the service center 100.

The customer-cellular phone 40 receives the purchase number and the e-mail address of the service center 100 (step S103). The customer-cellular phone 40 sends the shop 30 a telephone number, an e-mail address, a name, an address and the like as user information of the customer (step S104). In a case in which the user information is registered in the customer-cellular phone 40, the registered user information is sent to the shop 30.

After the communication means 35 of the shop 30 transmits the purchase number and the e-mail address of the service center 100 in the step S102, the communication means 35 automatically receives the user information from the customer—cellular phone 40 and then transmits purchased product information concerning the product that the customer purchased, the purchase number, and the user information (step S105). When the user information received from the customer-cellular phone 40 does not include the e-mail address of the customer, the name, the address or the like, the communication means 35 of the shop 30 may connect to a communication service provided by a communication company to obtain the above information based on the customer telephone number. Alternatively, when the shop 30 confirms the customer the user registration, the shop 30 may obtain necessary information from the customer.

The service center 100 retrieves necessary product information from a product information DB 51 concerning products handled by the shop 30 based on the purchased product information received from the shop 30, the purchase number and a purchased date and then creates warranty information. Also, the service center 100 creates customer information including the warranty information (step S106). The created customer information is registered to customer information DB 52 in the storage unit 16 in FIG. 2.

For example, the service center 100 sends the given e-mail address notifying the customer of a message of "Thank you for purchasing our product", to the customer-cellular phone 40 by e-mail (step S107). When the service center 100 sends the message of "Thank you for purchasing our product", the service center 100 creates the purchased product information concerning the product that the customer purchased from the product information DB 51 and the customer information DB 52. Also, the service center 100 includes the purchased product information and purchase number in the message in accordance with a predetermined form. Hereinafter, a message is transmitted by e-mail.

In step S108, the customer receives the message of "Thank you for purchasing our product" from the service center 100 by the customer-cellular phone 40. The customer confirms that the user registration is completed. Also, the customer-cellular phone 40 creates a purchased product list by confirming that the purchase number received in the step S103 is identical based on the purchased product information and the purchase number.

As described above, from the user registration registered by the customer-cellular phone 40, the service center 100 can maintain the warranty of the product that the customer purchased, instead of the conventional way in that the customer maintains a warranty paper sheet by ones self.

In addition, the customer-cellular phone 40 creates information corresponding to the conventional warranty paper sheet. Therefore, it is possible to eliminate a trouble of maintaining the warranty paper sheet for the customer.

Furthermore, the customer is not required to pay a communication fee because the user registration process is conducted through the shop 30. Also, with the shop 30 handling the user registration, it is possible to set the shop number identifying the shop 30 where the customer purchased the product.

In step S108 in FIG. 3, for example, the purchased product list created by the customer-cellular phone 40 is displayed at the customer-cellular phone 40 as shown in FIG. 4.

FIG. 4 is a diagram showing a display example of the purchased product list, according to the embodiment of the present invention.

In FIG. 4, a purchased product list 60 for a telephone number "090-1111-1111" of a customer "FUJI, Michiko" is displayed at the customer-cellular phone 40.

Referring to FIG. 4, the purchased product list 60 shows that a manufacture number "RH-HF0002" of a product name "TV SET" purchased from a maker name "MAKER H" indicated by a number "01" is maintained by the purchase number "AAAAAA00000011" and "hhh@hhh.co.jp" is shown to contact a service person about the purchased product. Also, the purchased product list 60 shows that a manufacture number "AA-EDH01" of a product name "RADIO-CASSETTE" purchased from a maker name "MAKER F" indicated by a number "02" is maintained by the purchase number "BBBBBB00000011" and "fff@fff.co.jp" is shown to contact a service person about the purchased product. The above maker names and e-mail address are additionally provided by the service center 100 based on the product information DB 51.

A process for requesting a repair from the purchased product list created by the customer-cellular phone 40 will now described with reference to FIG. 5 and FIG. 6.

Figure 5:
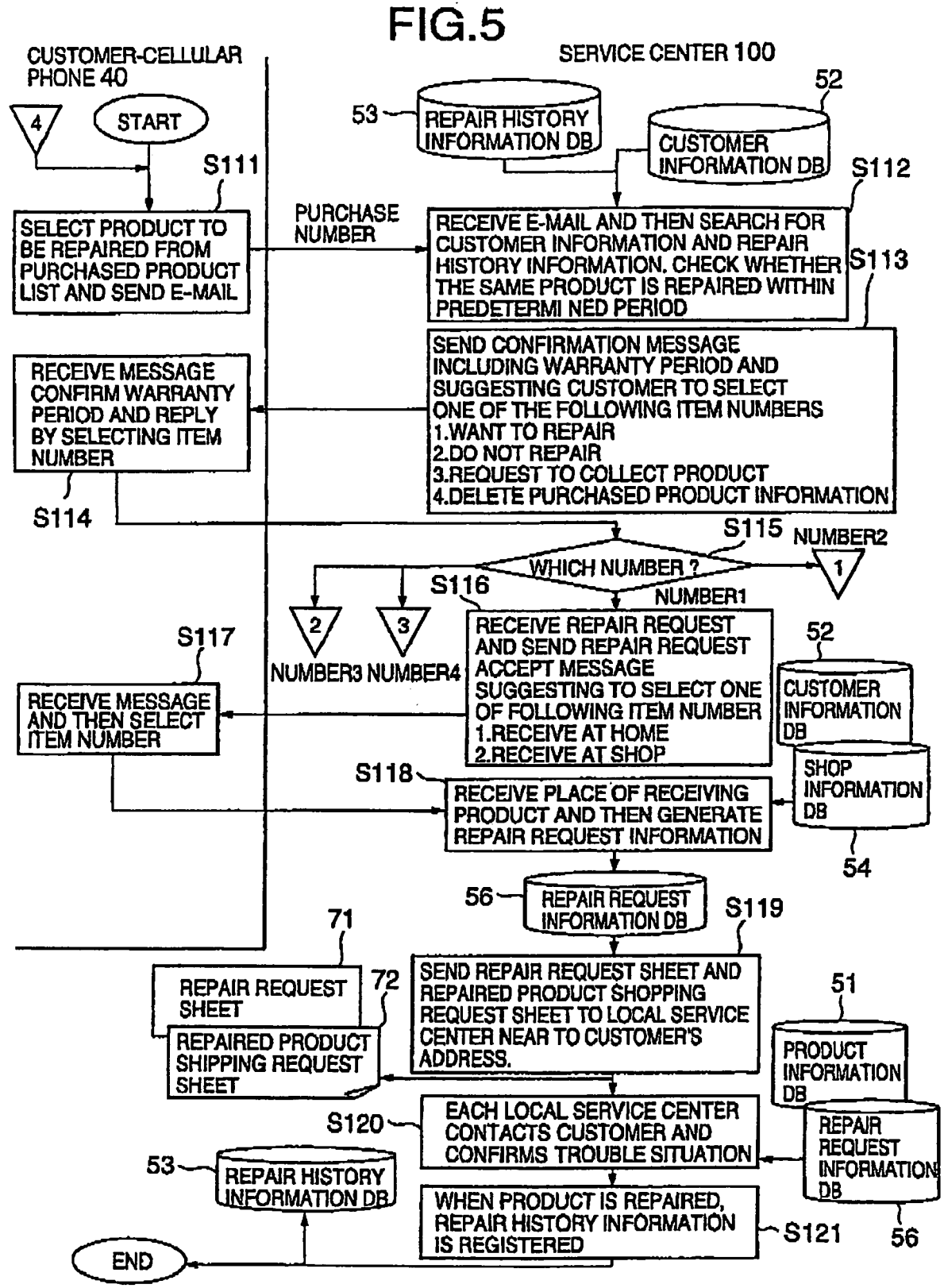
FIG. 5 is a flowchart for explaining a process for requesting a repair by utilizing a customer-cellular phone, according to the embodiment of the present invention.
Figure 6:
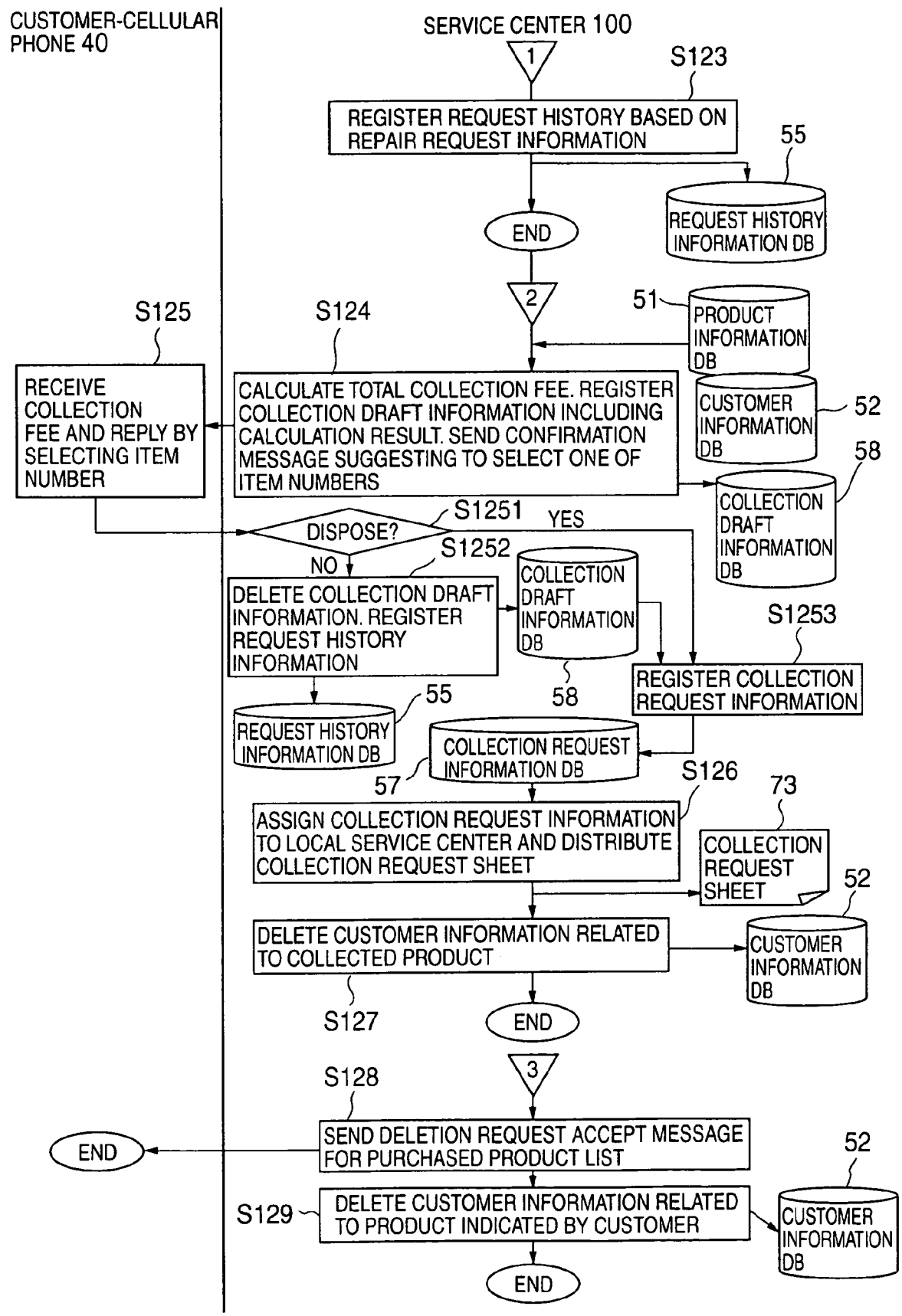
FIG. 6 is a flowchart for explaining the process for requesting a repair by utilizing the customer-cellular phone, according to the embodiment of the present invention.

FIG. 5 and FIG. 6 are flowcharts for explaining the process for requesting a repair by utilizing the customer-cellular phone 40, according to the embodiment of the present invention.

In FIG. 5, in step S111, the customer selects one product to be repaired from the purchased product list 60 displayed at the customer-cellular phone 40. For example, the customer selects the number "01" from the purchased product list 60 and then pushes a button to send an e-mail. The purchased product list 60 creates a repair request form including the purchase number indicated by the number "01" and then sends to the service center 100. However, if there is no purchased product list 60, which is created by the customer-cellular phone 40, because a model of the customer-cellular phone 40 is changed, the customer connects to the service center 100 and then the purchased product list 60 is downloaded to the customer-cellular phone 40 from the service center 100.

In step S112, the service center 100 obtains the purchase number from the e-mail of the repair request received from the customer and then retrieves the customer information from the customer information DB 52 and repair history information from a repair history information DB 53 based on e-mail address of a sender. Also, the service center 100 searches for information showing that the product is to be repaired within a predetermined period.

In step S113, the service center 100 obtains the warranty period based on the purchase number and then sends the customer-cellular phone 40 a confirmation message including the warranty period, contents for confirming whether or not the product is to be repaired within the predetermined period and contents for confirming whether or not the customer wants to repair the product at this time. The confirmation message sent to the customer-cellular phone may include at least the following four request items:

1. want to repair
2. do not repair
3. request to collect the product
4. delete purchased product information.

Also, the service center 100 searches for information indicating the product is to be repaired within the predetermined period, from the repair history information DB 53.

In step S114, the customer receives the confirmation message from the service center 100 by the customer-cellular phone 40 and then confirms the warranty period. By the system informing the customer of the warranty period, the customer easily confirms that the repair is before or after the warranty is expired. The customer selects one request item from the received confirmation message. That is, the customer replies to the service center 100 by an e-mail input by selecting one of request item numbers 1 through 4; since the customer indicates one request item by selecting the number, it is possible for the customer to easily create a message.

In step S115, the service center 100 checks the reply message from the customer-cellular phone 40. When the reply message shows the request item number "1", the process goes to step S116. When the reply message shows the request item number "2", the process goes to step S123 of FIG. 6. When the replied message shows the request item number "3", the process goes to step S124 of FIG. 6. When the reply message shows the request item number "4", the process goes to step S128 of FIG. 6.

In the step S116, when the reply message showing the repair request (the request item number "1") is received from the customer-cellular phone 40, the service center 100 sends a repair request accept message showing that the repair request is accepted. The repair request accept message includes contents requesting the customer to select one place that is to receive the repaired product in a case in which the repaired product is supposed to be shipped. That is, the repair request accept message includes the following:

1. receive at home
2. receive at the shop where you purchased the product.

In step S117, the customer receives the repair request accept message from the service center 100. When the repair request accept message includes contents requesting the customer to select the place for receiving the repaired product, the customer sends a reply message, selecting one place, to the service center 100.

In step S118, when the service center 100 receives the place of receiving the repaired product from the customer-cellular phone 40, the service center 100 generates repair request information showing that the repair request is made by the customer based on the selection of the place by using the customer information DB 52 and a shop information DB 54. The generated repair request information is accumulated in a repair request information DB 56.

In step S119, the service center 100 assigns the repair request information to another service center 100 near to the address of the customer included in the repair request information. Based on the repair request information, a repair request sheet 71 to be distributed to a local service center, such as the service center 100, is generated. At the same time, a repaired product shipping request sheet 72 is generated. The generated repair request sheet 71 and the repaired product shipping request sheet 72 are distributed to the local service center.

In step S120, a service person of the local service center searches for the product information from the product information DB 51 and for the repair request information from the repair request information DB 56 based on the distributed repair request sheet 71, and then contacts the customer to confirm a trouble situation. The service person telephones the customer to confirm details of repair and then visits the customer to repair the product if necessary.

In step S121, when the service person completes the repair, the service person registers the repair history information to the repair history information DB 53 in order to guarantee to repair, in the future, the same trouble with the product. Then, the local service center terminates the repair process.

When the replied message shows the request item number "2" (do not repair) in the step S115, the service center 100 registers request information showing a history of a request to a request history information DB 55 based on the repair request information from the customer-cellular phone 40 in step S123 in FIG. 6. Then, the service center 100 completes the repair process.

When the replied message shows the request item number "3" (request to collect the product) in step S115, the service center 100 searches for the product information concerning the product, that the customer requests to dispose of, from the product information DB 51 and then obtains all collection fees to calculate total collection fee in step S124 in FIG. 6. The service center 100 creates collection draft information including the calculated total collection fee based on the replied message and then registers to a collection draft information DB 58. Also, the service center 100 sends a confirmation message including the total collection fee for confirming whether or not the customer wants to dispose of the product. For example, the confirmation message includes the following selectable request items as to the product:

1. want to dispose of it
2. do not dispose of it.

In step S125, when the customer receives the confirmation message from the service center 100 by the customer-cellular phone 40, the customer confirms the total collection fee and then replies to the service center 100 by selecting one request item number to be included in a replied (i.e., reply) message.

In step S1251, when the service center 100 receives the request item number selected by the customer, the service center 100 checks the replied message showing whether or not the customer wants to dispose of the product rather than to repair same. When the replied message shows that the customer wants to dispose of the product, the process goes to step S1253. When the replied message shows that the customer does not want to dispose of the product, the process goes to step S1252.

In step S1252, the service center 100 deletes the collection draft information, which is registered in the step S124, from the collection draft information DB 58, and then registers same, as the request history information, to the request history information DB 55.

In step S1253, the collection request information is registered in a collection request information DB 57 based on the collection draft information maintained in the collection draft information DB 56.

In step S126, the service center 100 obtains an address of the customer from the collection request information registered to the collection request information DB 57 and then assigns the collection request information to the local service center. Also, the service center 100 creates a collection request sheet 73 and then distributes same to the local service center.

A service person of the local service center, such as the service center 100, collects the product from the customer, who requests that it be collected, based on the distributed collection request sheet 73.

In step S127, the service center 100 deletes the customer information related to the collected product from the customer information DB 52 when it is completed to collect the product. The service center 100 completes the repair request process.

In a case in which the replied message from the customer shows the number 4 (delete purchased product information) in the step S115, when the service center 100 receives a deletion request of the purchased product information from the customer, the service center 100 replies to the customer-cellular phone 40 by a deletion request accept message in step S128 in FIG. 6.

In step S129, the service center 100 deletes the customer information related to the product indicated by the customer from the customer information DB 52. The service center 100 completes the process.

In a case in which the purchased product list is not registered in the customer-cellular phone 40 because of change of a phone model, a process for obtaining the purchased product list from the service center 100 will now be described.

Figure 7:
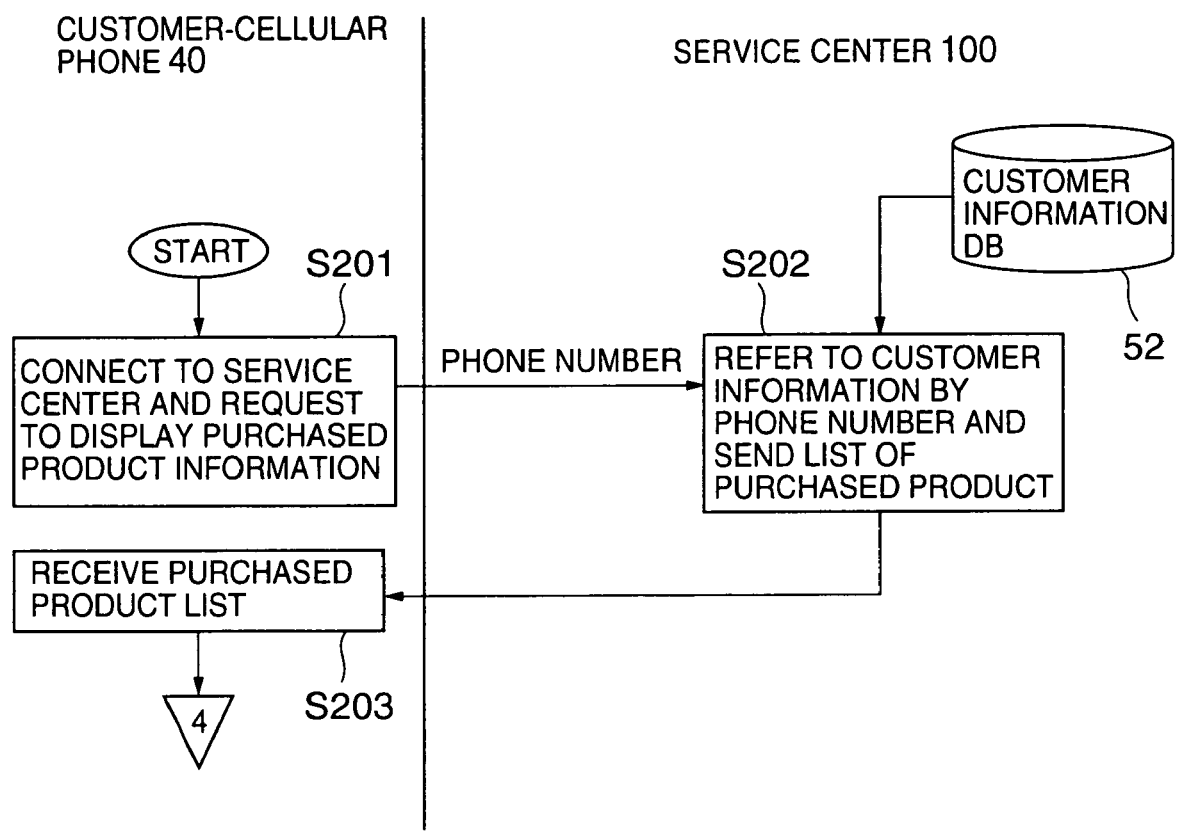
FIG. 7 is a flowchart for explaining a process for obtaining a purchased product list from a service center according to the embodiment of the present invention.

FIG. 7 is a flowchart for explaining a process for obtaining the purchased product list from the service center.

Referring to FIG. 7, in step S201, the customer connects to the service center 100 from the customer-cellular phone 40 and requests to display the purchased product information.

In step S202, the service center 100 retrieves the customer information corresponding to the telephone number of the customer from the customer information DB 52, and then generates a list of products that the customer purchased. The service center 100 replies to the customer-cellular phone 40 by sending generated list of the products as the purchased product list.

In step S203, the customer-cellular phone 40 displays the purchased product list received from the service center 100. When the customer requests to repair a product based on the displayed purchased product list, the step S111 in FIG. 5 is repeated.

As described above, since all the customer information is centralized in the customer information DB 52 in the service center 100, even if the customer-cellular phone 40 does not include the purchased product list, it is possible for the customer to obtain the purchased product list from the service center 100 by using the customer-cellular phone 40 and then to easily make a request of repairing a purchased product.

The repair request sheet 71 generated in step S119 and distributed to the local service center near to the address of the customer will now be described.

FIG. 8 is a diagram showing a repair request sheet 71 according to the embodiment of the present invention.

In FIG. 8, the repair request sheet 71 related to the purchase number "AAAAAA00000011" issued on "Oct. 9, 2000" includes service center information 711 concerning the local service center to request a repair, request product information 713 concerning the product to be repaired, customer information 715 concerning the customer who wants to repair the product.

The service center information 711 includes information of an address of the local service center where the repair request sheet 71 is distributed in the step S119.

The request product information 713 includes a maker name, a manufacture number, a product name, a warranty period showing a warranty expiration date for the product that the customer purchased and information showing whether or not the product had been repaired before.

The customer information 715 includes the address of the customer who requests to repair the product.

FIG. 9 is a diagram showing the repaired product shipping request sheet 72 according to the embodiment of the present invention.

In FIG. 9, the repaired product shipping request sheet 72 related to the purchase number "AAAAAA00000011" issued on "Oct. 9, 2000" includes shipping-to information 721 concerning an address where a repaired product is shipped, repaired product information 723 concerning the repaired product, shipping-from information 725 concerning the local service center shipping the repaired product.

The shipping-to information 721 includes an address of the customer who requests to repair, a name, a telephone number and the like.

The repaired product information 723 includes a product name that the customer requests to repair, a manufacture number and the like.

The shipping-from information 725 includes an address of the local service center that repaired, a name, a telephone number and the like.

FIG. 10 is a diagram showing the collection request sheet according to the embodiment of the present invention.

In FIG. 10, the collection request sheet 73 related to the purchase number "AAAAAA00000011" issued on "Oct. 9, 2000" includes collection service information 731 concerning the local service center that collects the product to dispose of, product information 733 concerning the product to collect, customer information 735 concerning the customer that requests the service center to collect the product.

The collection service information 731 includes an address of the local service center where the repair request sheet 71 is distributed in the step S126.

The product information 733 includes a maker name of the product that is collected from the customer, a manufacture number, a product name, collection fee informed to the customer in the step S124 and the like.

The customer information 735 includes information concerning the address of the customer that requested to collect the product.

A process, in a case in which the customer asks the shop 30 a repair situation after the repair request of the purchased product, will now be described.

Figure 11:
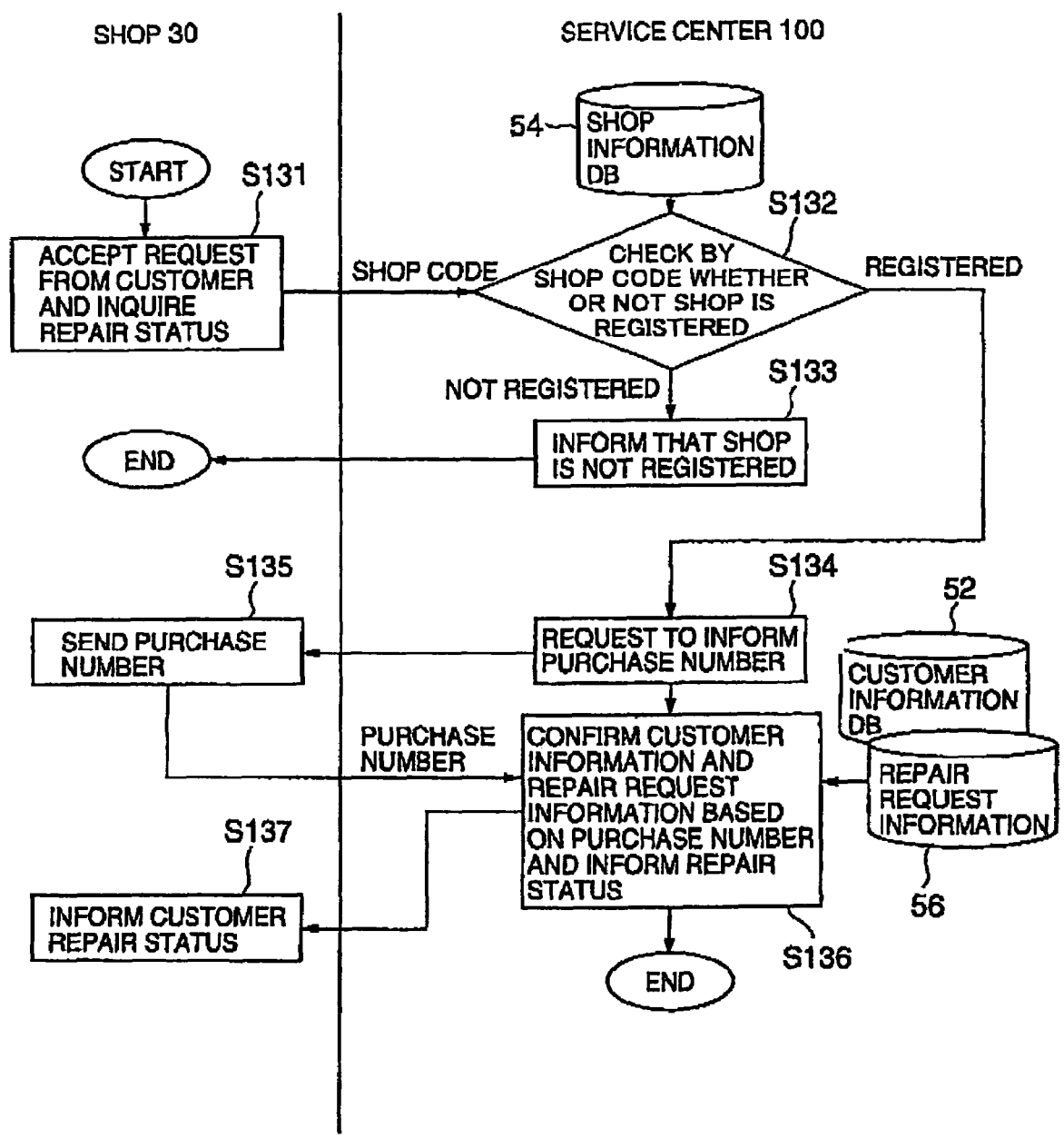
FIG. 11 is a flowchart for explaining a process for confirming a repair situation according to the embodiment of the present invention.

FIG. 11 is a flowchart for explaining the process for confirming the repair situation according to the embodiment of the present invention.

In FIG. 11, in step S131, the shop 30 accepts a request from the customer and then requests the repair situation of the service center 100. That is, the shop 30 sends a message including the shop code and requesting the repair situation to the service center 100.

In step S132, the service center 100 checks the shop 30 by the received shop code. That is, the service center 100 searches for the shop code from the shop information DB 54 and then determines whether or not the shop 30 is registered.

When it is determined that the shop 30 is not registered, in step S133, the service center 100 notifies of the shop 30 that the shop 30 is not registered.

When it is determined that the shop 30 is registered, in step S134, the service center 100 requests the shop 30 to notify information of requested product of the service center 100.

In step S135, the shop 30 sends the purchase number to request the repair situation.

In step S136, the service center 100 confirms the customer information and the repair request information corresponding to received purchase number by searching for the customer information DB 52 and the repair request information DB 56, respectively. And also, the service center 100 generates repair situation information by referring to the repair history information corresponding to the purchase number from the repair history information DB 53 and then notifies the shop 30 of the generated repair situation information.

In step S137, the shop 30 confirms the repair situation information notified from the service center 100 and then contacts the customer to inform same of the repair situation. The process for confirming the repair situation is completed.

An advertising process for replacement products to the customer-cellular phone 40 from the service center 100 will now be described.

Figure 12:
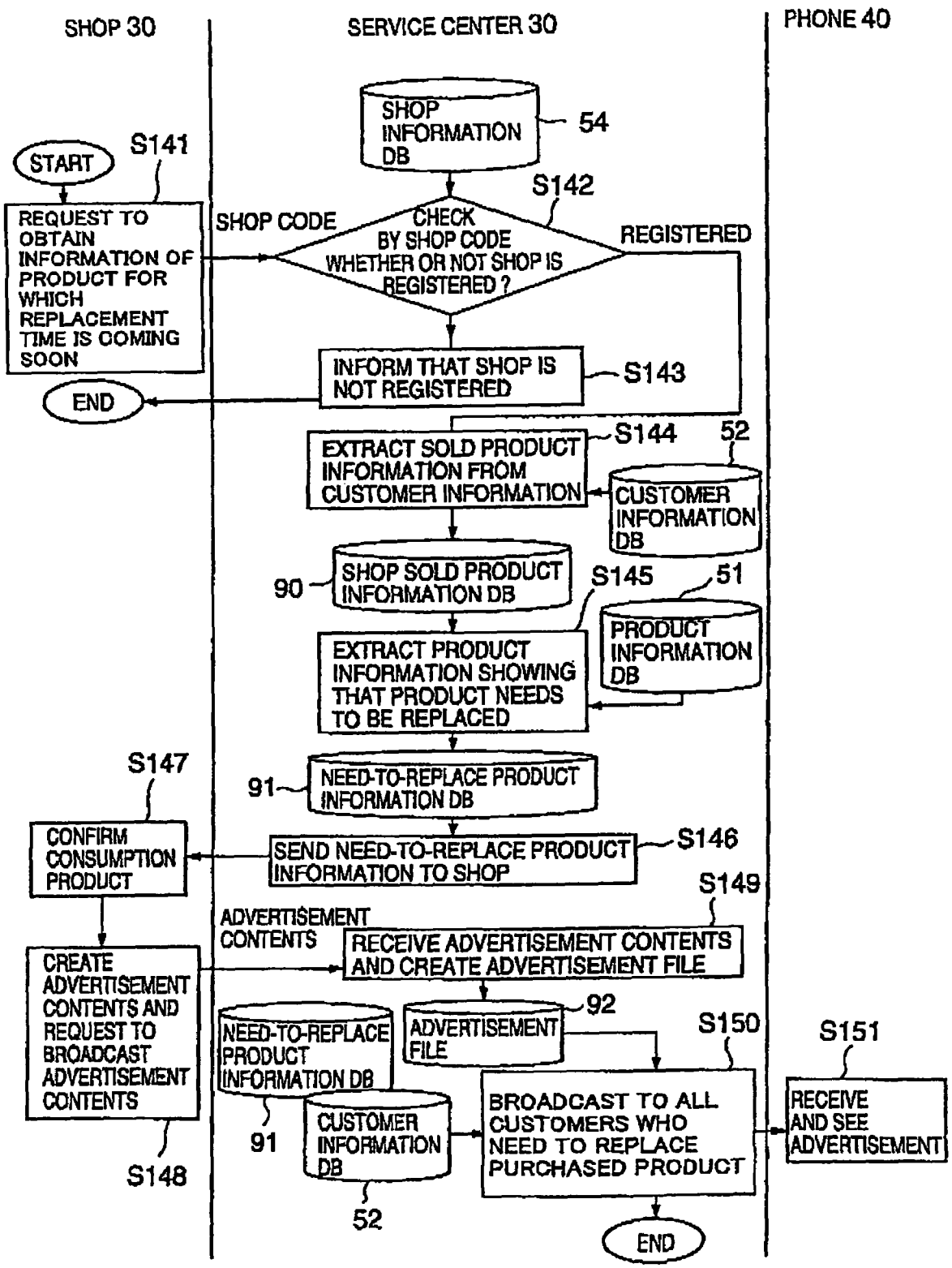
FIG. 12 is a flowchart for explaining an advertising process for replacement products according to the embodiment of the present invention.

FIG. 12 is a flowchart for explaining the advertising process for replacement products according to the embodiment of the present invention.

In FIG. 12, in step S141, the shop 30 requests the service center 100 to obtain information of products that the customer purchased and for which a replacement time is coming soon.

In step S142, the service center 100 checks, by searching for the shop information DB 54 based on the received shop code, whether or not the shop 30 is registered.

When it is determined that the shop 30 is not registered, in step S143, the service center 100 informs the shop 30 that the shop 30 is not registered.

When it is determined that the shop 30 is registered, in step S144, the service center 100 searches for the customer information corresponding to the shop code for the customer information DB 52 and then retrieves sold product information related to products that the shop 30 sold. The service center 100 stores the retrieved sold product information to a shop sold product information DB 90.

In step S145, the service center 100 refers to a replacement time of each product information maintained in the product information DB 51 and extracts product information showing that a replacement time is coming soon or has passed, based on a purchased date and the replacement time of the product from the shop sold product information DB 90. The service center 100 stores the extracted product information as need-to-replace product information, to a need-to-replace product information DB 91.

In step S146, the service center 100 sends the need-to-replace product information, stored in the need-to-replace product information DB 91, to the shop 30.

In step S147, the shop 30 confirms the need-to-replace product information received from the service center 100.

In step S148, when the shop 30 requests the service center 100 to broadcast an advertisement, based on the received need-to-replace product information, the shop 30 decides recommended products, discount rates and the like at the shop 30 and then creates advertisement contents. Subsequently, the shop 30 sends an advertisement broadcast request message requesting the service center 100 to broadcast the advertisement, based on the created advertisement contents.

In step S149, the service center 100 creates an advertisement file 92 when the service center 100 receives the advertisement contents.

In step S150, the service center 100 searches for the customer information DB 52 by the purchase number of each need-to-replace product information, maintained in the need-to-replace product information DB 91 and then broadcasts the advertisement contents of the advertisement file 92 to each customer, based on the customer information retrieved from the customer information DB 52.

In step S151, the customer receives the advertisement contents by the customer-cellular phone 40 and refers to the advertisement contents for a next time of purchasing a product. The advertising process for replacement products is completed.

A recall process in a case in which a defective product is disclosed will now be described.

FIG. 13 is a flowchart for explaining the recall process according to the embodiment of the present invention.

In FIG. 13, in step S301, the service center 100 retrieves lot information from a component information DB 512 based on component information of a defect (i.e., defective) component of the product shown by the repair history information DB 53. Subsequently, the service center 100 creates defect product information and stores same to a defect product information DB 81. Also, the service center 100 creates a defect status based on the repair history information DB 53 and stores same to the defect status DB 82.

In step S302, the service center 100 extracts recall product information from the lot information of the defect product information and then stores recall product information DB 83.

In step S303, based on the recall product information stored in the recall product information DB 83, the service center 100 searches for the customer information related to the customers who purchased the product to be recalled, from the customer information DB 52. The customer information retrieved from the customer information DB 52 is stored in a customer-for-recall information DB 84.

In step S304, the service center 100 creates a recall message, showing recall information based on the defect status maintained in the defect status DB 82, and sends same to all customers indicated by the customer-for-recall information maintained in the customer-for-recall information DB 84.

In step S305, each indicated customer receives the recall message from the service center 100 by the customer-cellular phone 40 and then confirms the defect product indicated by the recall message, the defect status, the handling method and the like.

In the recall process, since the repair history information, the product information, the component information, the customer information and the like are centralized in the service center 100, it is easy for the service center 100 to obtain the customer information of the customers to whom information of recall and defect products is informed. Therefore, it is possible to effectively and properly notify each customer, who needs to know of the recall of the product that the customer purchased, of the recall status.

Also, the service center 100 can obtain shop information of shops 30 that sold the recall product from the customer information DB 52, and send the recall message to the shop 30.

Databases maintained by the service center according to the embodiment of the present invention will now be described.

FIG. 14A is a diagram showing the product information DB 51 according to the embodiment of the present invention.

In FIG. 14A, the product information DB 51, for example, may be a database (DB) for products registered by makers that make a contract with the service center 100. Each product information maintained in product information DB 51 includes a record number, a manufacture number of a product, a product name, a warranty period showing a period in which the product is guaranteed, a replacement time showing a time to replace the product, a collection fee showing an expense to collect the product, lot information showing a lot by which the product is manufactured, a manufactured date of the product, a maker name that manufactured the product, a maker e-mail to contact the maker and the like.

The warranty period is referred to when the customer information is registered in the customer information DB 52.

The replacement time is referred to with the purchased data when the customer purchased the product, when an advertisement is created to promote the product.

The collection fee is charged to the customer when the customer requests to collect the purchased product.

The lot information is associated with the component information DB 512. For example, when a defect of a component is disclosed, products corresponding to the lot information are retrieved.

The maker name and the maker e-mail are used to contact the maker to ask about the product. For example, the maker name and the maker e-mail are referred to when the purchased product list for the customer is created.

FIG. 14B is a diagram showing the component information DB according to the embodiment of the present invention.

In FIG. 14B, each component information maintained in the component information DB 512 includes a record number, a component number identifying a component, a component name, a lot ID identifying a lot of product including the component, a manufactured date when the lot is manufactured and the like.

The lot is associated with the lot information maintained in the product information DB 51. For example, when a defect of a component is disclosed, products corresponding to the lot information are retrieved from the product information DB 51.

FIG. 15A is a diagram showing the customer information DB according to the embodiment of the present information.

In FIG. 15A, each customer information, which the service center 100 registered in the customer information DB 52, includes a record number, warranty information concerning a warranty, a cellular phone number of the customer, a phone e-mail of the customer, a name of the customer, an address of the customer and the like. The warranty information includes the purchase number including a shop number, a product name and a manufacture number for a purchased product information, a device address, a purchased date when the customer purchased the product, a warranty period for guaranteeing the product and the like.

The device address shows an Internet address when the Internet address is provided on the product.

The cellular phone number is used to contact the customer or to charge for the product.

The phone e-mail is used to send information from the service center 100 to the customer.

A date calculated by adding the warranty period, managed in the product information DB 51, to the purchased date is defined as the warranty period in the warranty information. The warranty period is used when the customer requests to repair the product.

In FIG. 15A, for example, the customer information DB 52 shows that the customer "FUJI, Michiko" purchased a product "TV SET" of the manufacture number "RH-HF0002" on "Jan. 7, 2000" and also purchased a product "RADIO-CASETTE" of the manufacture number "AA-EDH01" on "Jan. 8, 2000".

FIG. 15B is a diagram showing the shop information DB according to the embodiment of the present invention.

In FIG. 15B, the shop information DB 54 includes a record number, a shop code identifying a shop, a shop name, a shop phone number, an e-mail to contact to the shop, an address of the shop and the like.

For example, the shop code is used to check whether or not the shop 30 is registered, when the shop 30 requests to obtain replacement products.

The e-mail is used to provide information to the shop 30.

For example, in order to realize the above product information management system, the service center 100 is functionally structured as shown in FIG. 16.

FIG. 16 is a diagram showing a functional structure of the service center according to the embodiment of the present invention.

In FIG. 16, the service center 100 includes a control part 101, a customer information managing part 102, a repair request processing part 103, a collection request processing part 104, a purchased product information deleting part 105, a purchased product list creating part 106, a repair status request processing part 107, a need-to-replace product information generating part 108, an advertisement processing part 109, a recall processing part 110, an input/output part 114, a display part 115 and a communication control part 118. In addition, the service center 100 includes the product information DB 51, the component information DB 512, the customer information DB 52, the repair history information DB 53, the shop information DB 54, the request history information DB 55, the repair request information DB 56, the collection request information DB 57, the collection draft information DB 58, the defect product information DB 81, the defect status DB 82, the recall product information DB 83, the customer-for-recall information DB 84, the shop sold product information DB 90, the need-to-replace product information DB 91 and the advertisement file 92 in the storage unit 16 in FIG. 2.

The input/output part 114 processes data to input to the input unit 14 in FIG. 2 and to output to the output unit 13 in FIG. 2.

The display part 115 processes data to display at the display unit 15 in FIG. 2.

The communication control part 118 controls the communication unit 16 in FIG. 2 to transmit and receive data.

The control part 101 corresponds to the CPU 11 in FIG. 2 and controls the entire service center 100. Based on data sent or received by the communication part control 118, the control part 101 controls each of processing parts 102 through 109.

The customer information managing part 102 registers the customer information with the product information concerning a product based on the product information DB 51, when the customer purchases the product.

The repair request processing part 103 creates repair request information based on a repair request message from the customer-cellular phone 40 and stores the repair request information to the repair request information DB 56. In addition, the repair request processing part 103 distributes each repair request sheet 71 to each local service center based on each repair request information maintained in the repair request information DB 56. The repair request processing part 103 registers the repair history information to the repair history information DB 53 when the product is repaired. On the other hand, when the customer cancels a request to repair, after the customer has sent the repair request message, the repair request processing part 103 stores information showing that the customer made a repair request, to the request history information DB 55.

The collection request processing part 104 creates the collection draft information and stores same to the collection draft information DB 58, based on the collection request message related to the purchased product from the customer-cellular phone 40. When the collection request processing part 104 receives a message, indicating to collect, from the customer-cellular phone 40, the collection request processing part 104 creates a collection request information, based on the collection draft information stored in the collection draft information DB 58, and registers the collection request information to the collection request information DB 57. In addition, the collection request processing part 104 generates the collection request sheet 73, based on the collection request information maintained in the collection request information DB 57, and then distributes the generated collection request sheet 73 to a local service center. When the product is collected to be disposed of, the collection request processing part 104 deletes the customer information including the product information, of the product that is collected, from the customer information DB 52.

The purchased product information deleting part 105 deletes the customer information including the product information from the customer information DB 52, in response to the deletion request message indicating to delete the purchased product information from the customer-cellular phone 40.

The purchased product list creating part 106 creates the purchased product list 60 based on the customer information including the product information of the product, which the customer purchased, from the customer information DB 52 in response to the request message requesting to obtain the purchased product list 60 from the customer-cellular phone 40. Then, the purchased product list creating part 106 sends the created purchased product list 60 to the customer by e-mail.

The repair status request processing part 107 searches for the shop information for the shop information DB 54 in response to the request message requesting the repair status from the shop 30 and then confirms that the shop 30 is registered. The repair status request processing part 107 informs the repair status to the shop 30, based on the repair request information maintained in the repair request information DB 56.

The need-to-replace product information generating part 108 retrieves the product information based on the customer information of the customer who purchased the product from the shop 30, which shop information is stored in the customer information DB52, in response to the message requesting to obtain information of need-to-replace products, which the shop 30 sold to customers and which replacement time is coming soon. The need-to-replace product information generating part 108 stores the retrieved product information, as the shop sold product information, to the shop sold product information DB 90. Subsequently, the need-to-replace product information generating part 108 retrieves the product information, showing same as to be replaced, based on the replacement time of the product information maintained in the product information DB 51, and then stores the product information, as the need-to-replace product information, to the need-to-replace product information DB 91. The need-to-replace product information generating part 108 informs the shop 30 of the information related to the need-to-replace product, based on the need-to-replace product information.

The advertisement processing part 109 creates the advertisement file based on the request message, requesting to advertise from the shop 30, and stores the created advertisement file to the advertisement file 92. The advertisement processing part 109 sends the advertisement file to the customer-cellular phone 40 of each customer to whom the shop 30 sold products, by e-mail.

The recall processing part 110 creates the defect product information, of the defect product, based on the repair history information DB 53 and the component information DB 512, and then stores the defect product information to the defect product information DB 81. Also, the recall processing part 110 creates the defect status of the defect product and stores same to the defect status DB 82. The recall processing part 110 specifies the product to recall, based on the defect product information DB 81 and the product information DB 51, and then stores the product information related to the specified product, as the recall product information, to the recall product information DB 83. In addition, the recall processing part 110 extracts the information related to the customer who purchased the product to recall, based on the recall product information DB 83 and the customer information DB 52. The recall processing part 110 stores the extracted information as the customer-for-recall information DB 84. The recall processing part 110 informs each customer, of all customers who need to know about the recall, based on the customer-for-recall information maintained in the customer-for-recall information DB 84.

According to the embodiment of the present invention, the service center 100 centralizes the information concerning products that are sold and customers that purchased same. Therefore, when the product that the customer purchased needs repair, the service center 100 can inform the warranty period to the customer in response to the repair request message from the customer-cellular phone 40. Consequently, the customer is not required to maintain a warranty paper sheet for the product that the customer purchased. Also, in this case, it is possible for the customer to make a repair request by simply selecting a product from the purchased product list displayed at the customer-cellular phone 40.

Also, it is possible for the service center 100 to provide the product information of products, which the customer purchased, in response to the request message requesting to obtain the purchased product list 60, to the customer using the customer-cellular phone 40.

Furthermore, the service center 100 extracts the need-to-replace product information related to products, which the shop 30 sold and which is needed to replace (i.e., which needs to be replaced), in response to a request from the shop 30 and the need-to-replace product information is provided to the shop 30. Therefore, the shop 30 can effectively promote the replacement products based on the need-to-replace product information. In addition, the shop 30 can request the service center 100 to advertise, based on the need-to-replace product information. Consequently, the shop 30 is not required to maintain the customer information by itself.

In addition, according to the embodiment of the present invention, the service center 100 can specify customers that purchased a product to be recalled, and directly provide important information such as a recall to the customers.

In the embodiment of the present invention, the processes in the steps S112 and S113 in FIG. 5 correspond to the step (a) and the process in the step S113 in FIG. 5 corresponds to the step (b).

Also, the process in the step S111 in FIG. 5 corresponds to the step (w) and the process in the step S114 in FIG. 5 corresponds to the step (x).

The present invention is not limited to the specifically disclosed embodiments, variations and modifications, and other variations and modifications may be made without departing from the scope of the present invention.

The present application is based on Japanese Priority Application No. 2000-305298 filed on Oct. 4, 2000, the entire contents of which are hereby incorporated by reference.

The invention claimed is:

1. A method for managing product information, said method comprising:
    sending at least a purchased product information and a purchase number to a customer-terminal generated at the time of purchase particular to the purchase, with the purchase number being at least for subsequent related warranty generation and management;
    creating warranty information for a purchased product by a sales information management database, separate from a shop that generated the purchase number and the customer-terminal, after the time of the purchase and upon receipt of the purchase number and customer information by the sales information management database;
    receiving a repair request form including the purchase number from the customer-terminal;
    retrieving the created warranty information, corresponding to the purchase number received from the customer-terminal used by the customer, from the sales information management database managing the purchase number indicating the purchased product and the created warranty information of a warranty of the purchased product;
    informing selectable request items with the retrieved warranty information to the customer-terminal;
    conducting a repair process corresponding to one of the selectable request items, which is indicated from the customer-terminal;
    receiving, from a shop terminal, a repair status request including a shop identification information and a requesting of a repair status, corresponding to the conducted repair process;
    determining whether the shop identification information is registered by searching for the shop identification information in a shop registration database;
    obtaining the purchase number from the shop terminal, when the shop identification information is found in the shop registration database; and
    sending the shop terminal the repair status which is based on repair history information by searching in a repair history database managing the repair history information concerning the repair request, based on the purchase number.

2. The method as claimed in claim 1, wherein said conducting of the request process further comprises deleting the purchased product information and the warranty information of a product indicated by the purchase number received from the customer-terminal, from the sales information management database when one of the selectable request items, indicated from the customer-terminal, shows a request to delete information related to a product that the customer purchased.

3. The method as claimed in claim 1, further comprising:
    sending the customer information and the purchased product information, from the shop terminal, to the sales information management database for the creating of the warranty information, upon receipt by the shop terminal of the customer information from the customer terminal, wherein:

said sales information management database manages the customer information concerning the customer by corresponding the customer to the purchase number of the product that the customer purchased; and said conducting of the repair process comprises:

distributing a repair request sheet including repair information for a repair person who is selected by searching from the sales information management database based on the customer information corresponding to the purchase number received from the customer-terminal when one of the selectable request items, which is indicated from the customer-terminal, shows a request to repair the product that the customer purchased; and maintaining repair contents conducted by the repair person and the purchase number of a repaired product as the repair history information to the repair history database.

4. The method as claimed in claim 3, wherein said conducting of the request process further comprises:

notifying the customer of selectable receiving place items showing places to receive a repaired product such that said distributing a repair request sheet distributes said repair request sheet including one of the selectable receiving place items, which is indicated by the customer, to said repair person.

5. The method as claimed in claim 3, wherein said informing selectable request items comprises:

checking whether or not a same repair is conducted within a predetermined period, by searching for the repair history information from said repair history database based on the purchase number received from the customer; and informing said warranty information and said request items with a result of said checking to the customer.

6. The method as claimed in claim 3, further comprising:

searching for the purchase number corresponding to the repair contents showing a recall from said repair history database;

extracting the customer information from said sales information management database based on the search corresponding to the repair contents; and informing recall information to recall a product, to each customer who purchased the product based on the customer information extracted from said sales information management database.

7. A computer-readable recording medium having a program recorded thereon for causing a computer to manage product information, by:

sending at least a purchased product information and a purchase number to a customer-terminal generated at the time of purchase particular to the purchase, with the purchase number being at least for subsequent related warranty generation and management;

creating warranty information for a purchased product by a sales information management database, separate from a shop that generated the purchase number and the customer-terminal, after the time of the purchase and upon receipt of the purchase number and customer information by the sales information management database;

receiving a repair request form including the purchase number from the customer-terminal;

retrieving the created warranty information corresponding to the purchase number received from the customer-terminal used by the customer, from the sales information management database managing the purchase number identifying the purchased product and the warranty information of a warranty of the purchased product;

informing selectable request items with the retrieved warranty information to the customer-terminal;

conducting a repair process corresponding to one of the selectable request items, which is indicated from the customer-terminal;

receiving, from a shop terminal, a repair status request including a shop identification information and a requesting of a repair status, corresponding to the conducted repair process;

determining whether the shop identification information is registered by searching for the shop identification information in a shop registration database;

obtaining the purchase number from the shop terminal, when the shop identification information is found in the shop registration database; and sending the shop terminal the repair status which is based on repair history information by searching in a repair history database managing the repair history information concerning the repair request, based on the purchase number.

8. The computer-readable recording medium as claimed in claim 7, further comprising:

sending the customer information and the purchased product information, from the shop terminal, to the sales information management database for the creating of the warranty information, upon receipt by the shop terminal of the customer information from the customer terminal, wherein said sales information management database manages the customer information concerning the customer by corresponding the customer to the purchased product identification of the product that the customer purchased; and said conducting a request process comprises the codes of:

distributing a repair request sheet including repair information for a repair person who is selected by searching from the sales information management database based on the customer information corresponding to the purchased product identification received from the customer-terminal when one of the selectable request items, which is indicated from the customer-terminal, shows a request to repair the product that the customer purchased, and maintaining repair contents conducted by the repair person and the purchased product identification of a repaired product as the repair history information to the repair history database.

9. An apparatus for managing product information, comprising:

an output part sending at least a purchased product information and a purchase number to a customer-terminal generated at the time of purchase particular to the purchase, with the purchase number being at least for subsequent related warranty generation and management;

a sales information management database creating warranty information for a purchased product, separate from a shop that generated the purchase number and the customer-terminal, after the time of the purchase and upon receipt of the purchase number and customer information by the sales information management database, wherein the sales information management database further manages the purchase number identifying the purchased product and the warranty information identifies a warranty of the purchased product;

an input part receiving a repair request form including the purchase number from the customer-terminal;

a warranty information retrieving part retrieving the warranty information corresponding to the purchase number received from the customer-terminal used by the customer, from said sales information management database;

a request item informing part informing selectable request items with the warranty information retrieved by said warranty information retrieving part to the customer-terminal;

a repair process conducting part conducting a repair process corresponding to one of the selectable request items, which is indicated from the customer-terminal; and a service center part configured to:

receive, from a shop terminal, a repair status request including a shop identification information and a requesting of a repair status, corresponding to the conducted repair process;

determine whether the shop identification information is registered by searching for the shop identification information in a shop registration database;

obtain the purchase number from the shop terminal, when the shop identification information is found in the shop registration database; and send the shop terminal the repair status which is based on repair history information by searching in a repair history database managing the repair history information concerning the repair request, based on the purchase number.

10. The apparatus as claimed in claim 9, wherein customer information and the purchased product information are sent from the shop terminal to the sales information management database upon receipt by the shop terminal of the customer information from the customer terminal, wherein said sales information management database manages the customer information concerning the customer by corresponding the customer to the purchased product identification of the product that the customer purchased; and said request process conducting part comprises:

a repair request sheet distributing part distributing a repair request sheet including repair information for a repair person who is selected by searching from the sales information management database based on the customer information corresponding to the purchased product identification receive from the customer-terminal when one of the selectable request items, which is indicated from the customer-terminal, shows a request to repair the product that the customer purchased, and a repair contents maintaining part maintaining repair contents conducted by the repair person and the purchased product identification of a repaired product as the repair history information to the repair history database.

* * * * *

UNITED STATES PATENT AND TRADEMARK OFFICE
CERTIFICATE OF CORRECTION

PATENT NO.         : 7,194,429 B2
APPLICATION NO. : 09/805046
DATED                 : March 20, 2007
INVENTOR(S)       : Naohito Takae et al.

It is certified that error appears in the above-identified patent and that said Letters Patent is hereby corrected as shown below:

On The Title Page, Item -56-
First Page, (Other Publications), Line 6, change "Worlwide" to --Worldwide--.

On The Title Page, Item -56-
First Page, (Other Publications), Line 7, change "Loal" to --Local--.

Signed and Sealed this

Seventh Day of August, 2007

JON W. DUDAS
*Director of the United States Patent and Trademark Office*